United States Patent [19]
Snyder et al.

[11] Patent Number: 4,734,870
[45] Date of Patent: Mar. 29, 1988

[54] POSITION COORDINATE DETERMINATION DEVICE WITH DIAGONAL DELAY LINE

[76] Inventors: Edward J. Snyder, 6 MacArthur Rd., Trumbull, Conn. 06611; Jamie L. Barbetti, 64 Ellis St., Milford, Conn. 06460

[21] Appl. No.: 764,797

[22] Filed: Aug. 9, 1985

[51] Int. Cl.[4] .............................................. G08C 21/00
[52] U.S. Cl. ..................... 364/556; 333/148; 324/208; 33/125 W; 33/125 R; 178/18
[58] Field of Search ............ 364/556, 571, 561; 324/207, 208; 178/18; 333/148; 33/1 M, 1 CC, 125 R, 125 W

[56] References Cited

U.S. PATENT DOCUMENTS

| | | | |
|---|---|---|---|
| 3,801,733 | 4/1974 | Bailey | 178/18 |
| 4,071,818 | 1/1978 | Krisst | 324/208 |
| 4,144,574 | 3/1979 | Chamuel | 364/561 |
| 4,297,602 | 10/1981 | Kobayashi et al. | 333/148 |
| 4,451,698 | 5/1984 | Whetstone et al. | 178/19 |
| 4,477,877 | 10/1984 | Nakamura et al. | 364/556 |
| 4,482,784 | 11/1984 | Whetstone | 333/148 |
| 4,488,000 | 12/1984 | Glenn | 178/18 |
| 4,514,688 | 4/1985 | Whetstone | 324/208 |
| 4,587,378 | 5/1986 | Moore | 178/18 |

*Primary Examiner*—Errol A. Krass
*Assistant Examiner*—V. N. Trans
*Attorney, Agent, or Firm*—Rosen, Dainow & Jacobs

[57] ABSTRACT

An automatic position coordinate determining device comprises a data tablet which has a single magnetostrictive element in which strain waves are induced for determining the position coordinates of a pointer relative to a pair of mutually orthogonal coordinate axes obliquely disposed with respect to the magnetostrictive element. Two mutually orthogonal pluralities of parallel equidistantly spaced electrical conductors form a grid network on the top surface of the tablet. These pluralities of conductors are wrapped around the edge of the tablet and spatially compressed to form respective X and Y conductor grids over opposing quadrants of the tablet bottom surface. A movable pointer travels along the top surface of the tablet while the magnetostrictive element is arranged along the diagonal of the tablet bottom surface. The conductors of the X and Y grids are inductively coupled to the diagonal magnetostrictive element. When the pointer is pulsed, a current pulse is induced in at least one electrical conductor of each plurality, following which oppositely propagating strain waves are induced in the magnetostrictive element by the pulsed electrical conductor. The propagation times of the strain waves are determined and the position coordinates of the pointer are calculated therefrom.

20 Claims, 16 Drawing Figures

POSITION COORDINATE DETERMINATION DEVICE WITH DIAGONAL DELAY LINE

FIELD OF THE INVENTION

The invention relates to devices for determining the coordinates of a pointer on the surface of a tablet. More specifically, the invention relates to position coordinate determining devices wherein the position coordinate of a pointer with respect to a coordinate axis is determined by measuring the time of travel of a magnetostrictively induced strain wave along a magnetostrictive element from a point corresponding to the pointer position to a reference position at an end of the magnetostrictive element.

BACKGROUND OF THE INVENTION

It is known in the art of position coordinate determining devices, sometimes referred to as digitizers, to provide a construction which employs only a single length of a non-electrical signal propagation medium, i.e., a magnetostrictive medium, for each coordinate dimension and a respective grid comprising a plurality of spaced parallel electrical conductors, each conductor extending transversely from a point adjacent one of the magnetostrictive elements so as to permit measurement of strain wave travel time along each magnetostrictive element between a reference position and a position corresponding to the location of a pointer on the grid. Such a digitizer is disclosed in U.S. patent application Ser. No. 162,311, which teaches a construction for an automatic coordinate determining device having a tablet with a grid network of first and second sets of parallel spaced electrical conductors, which sets of conductors are mutually orthogonal. Each respective magnetostrictive element (i.e., wire) is situated with its axis transverse to the corresponding set of electrical conductors. A pointer is movably arranged adjacent the conductors. This pointer includes a flux-producing element which is inductively coupled to at least one conductor from each set of parallel conductors. When the flux-producing element is energized, an electrical current is induced in the proximal conductors, which current in turn induces a strain wave in the respective magnetostrictive element at a region adjacent the respective conductor. The magnetostrictive elements correspond respectively to the x and y coordinate axes. The strain wave induced in the respective magnetostrictive element travels along the axis to a region of the magnetostrictive element where a sensor means is provided. The respective sensor means acts as a sensor for producing a signal in response to detection of the traveling strain wave produced as a result of energization of the pointer. In addition, a fiducial signal induction coil is provided at each end of both magnetostrictive elements. These fiducial signal induction coils are energized to produce strain waves prior to pulsing of the cursor. The fiducial signal induction coils are both energized to produce a pair of traveling strain waves along the magnetostrictive element, which strain waves are received by the sensor means at the end of the magnetostrictive element. The signals output by the sensor means upon detection of the respective strain waves are clocked to determine the time of travel separating the two strain waves. This detected time of travel is then compared with a reference value corresponding to a standard length of the magnetostrictive element. The difference between the detected time of travel and the reference value represents an error which must be compensated for. It should be noted that this calibration process takes place without energization of the flux-producing element. After storage of the value of error compensation required, the logic and control network energizes the flux-producing element of the pointer. The time of travel of the strain wave induced by the pointer is then determined. The latter time of travel for each magnetostrictive element represents the corresponding uncompensated coordinates of the pointer position. Following compensation, the true coordinates of the pointer position are output to data storage or display.

This prior art digitizer has the disadvantage that the manufacturing costs are relatively high due to the provision of two magnetostrictive elements for use as delay lines, along with the associated damping blocks, sensor coils, amplifiers, and threshold discriminators.

SUMMARY OF THE INVENTION

It is the object of the present invention to provide a digitizer of the above-described type having only a single magnetostrictive element which is used to determine both the X and Y position coordinates of a pointer.

It is a further object of the present invention to provide a digitizer which is more simply and cheaply manufactured due to the elimination of a magnetostrictive element and its associated components, including the damping blocks, sensor coil, and fiducial coil. Furthermore, in accordance with a preferred embodiment of the invention utilizing sequential pulsing of the cursor, only a single preamplifier, a single threshold discriminator, and a single counter are required.

These objects are achieved in accordance with the present invention by providing a digitizer in which the magnetostrictive element is arranged along the diagonal of the tablet. In the case of a square tablet, the element will lie at an angle of 45° with respect to the coordinate axes.

BRIEF DESCRIPTION OF THE DRAWINGS

The preferred embodiment of the present invention will be described in detail with reference to the following drawings, wherein.

DETAILED DESCRIPTION OF THE PREFERRED EMBODIMENTS

Figure 1:
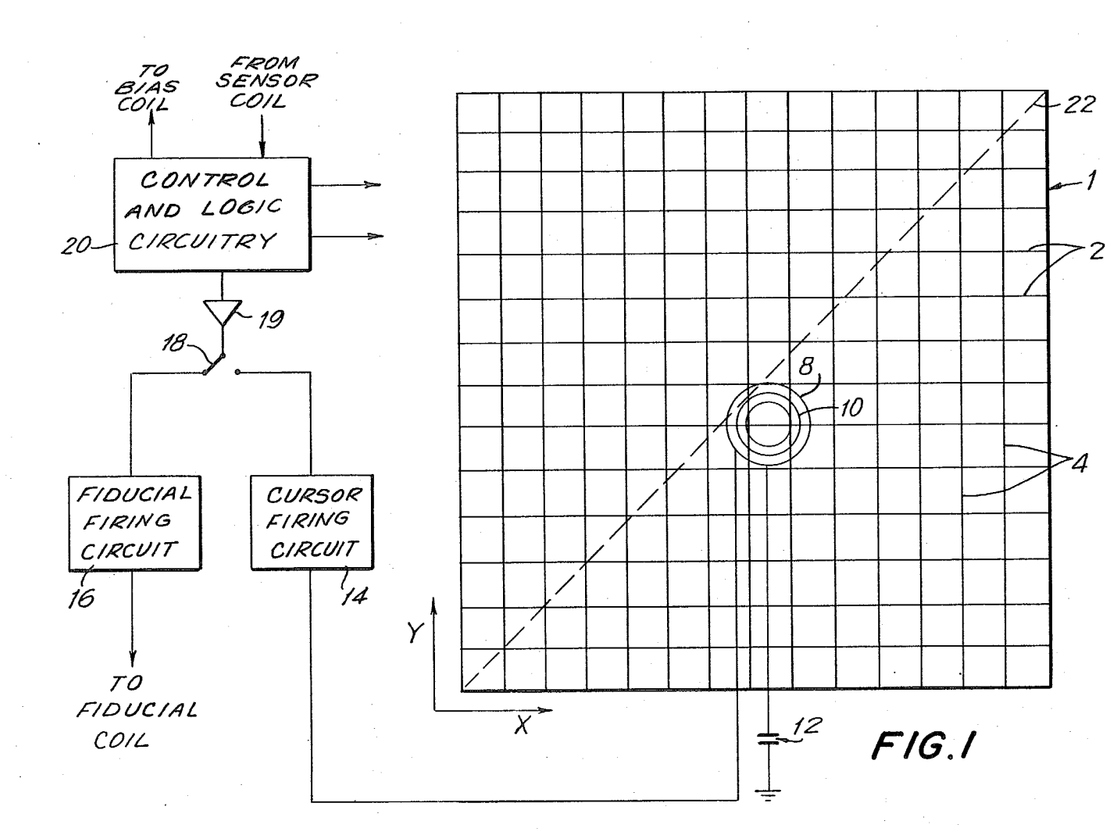
FIG. 1 is a top plan view of the conductor grid and the cursor with the logic and control network indicated in schematic form in accordance with the invention.
Figure 2A:
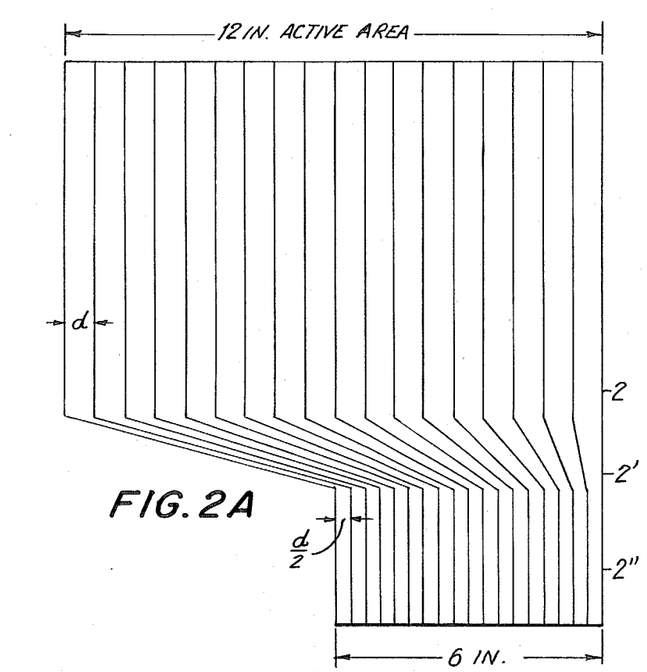
FIG. 2A is a diagrammatic depiction of a grid of electrical conductors according to a further embodiment of the present invention wherein the wrapped-around portions of the conductors are spatially compressed.
Figure 2B:
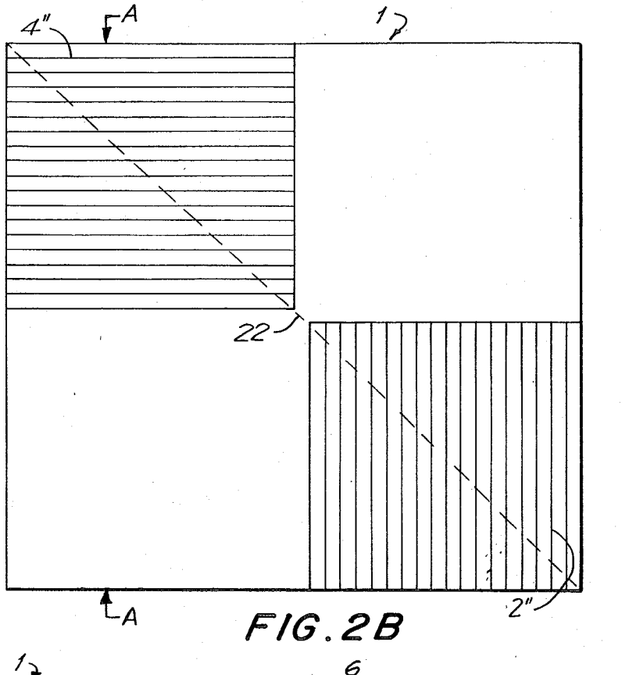
FIG. 2B is a bottom view of the data tablet of the further embodiment with the wrapped-around compressed portions of the respective grids of electrical conductors depicted.

The improved digitizer of the present invention comprises a data tablet 1 having embedded beneath its top surface first and second orthogonal pluralities of parallel equidistantly spaced electrical conductors 2 and 4 as depicted in FIG. 1. Each electrical conductor traverses the top surface of the data tablet and is then wrapped around an edge of the tablet, following which the respective conductors 2" and 4" traverse the bottom surface of the data tablet, as shown in FIGS. 2A and 2B. Although each wrapped-around electrical conductor (2, 2', 2" and 4, 4', 4") is disposed in a plane perpendicular to the tablet surfaces in the preferred embodiment, it is apparent to those having ordinary skill in the art that the conductor 2" or 4" crossing the bottom surface of the data tablet need not be parallel to the respective conductor 2 or 4 traversing the top surface of the data tablet. The dashed line 22 in FIG. 1 represents the position of a magnetostrictive element which in accordance with the invention is arranged along the diagonal of the bottom surface of the tablet.

It is well-known that an electrical current pulse can be produced in at least one of the electrical conductors 2 and at least one of the electrical conductors 4 by positioning a pointer 8 having a flux-producing element 10 on the top surface of the data tablet in proximity to the electrical conductors. A current pulse will be induced in the proximal conductors in response to the pulsing of the flux-producing element 10. A current pulse induced in an electrical conductor 2 which traverses the top surface of the tablet will be accompanied simultaneously by a current pulse in an electrical conductor 2" which traverses the bottom surface of the tablet, since the conductors 2 and 2" are connected by the respective conductor 2' wrapped around the edge of the tablet (see FIG. 2A). A current pulse in a conductor 2" traversing the bottom surface of the tablet will in turn induce a magnetostrictive wave in the diagonal magnetostrictive element 22 at the point along the element where the pulsed conductor 2" and the magnetostrictive element 22 are in proximity. More exactly, the current pulse will induce oppositely propagating strain waves at the point of proximity. These oppositely propagating strain waves will travel toward the respective ends of the magnetostrictive element 22. Likewise a current pulse induced in an electrical conductor 4 will travel along an electrical conductor 4" connected to conductor 4 by wrapped-around conductor 4, thereby producing a pair of oppositely propagating strain waves at a second point along the magnetostrictive element 22.

Figure 3:
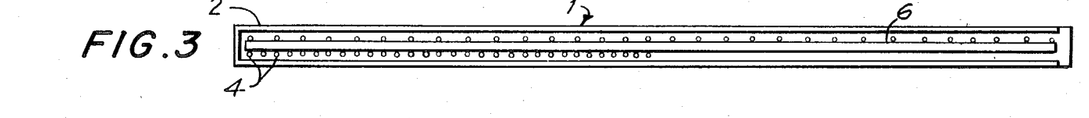
FIG. 3 is a cross-sectional view of the data tablet of FIG. 2B taken along section A—A.

The conductors 2 and 4 which traverse the top surface of the tablet are separated from the corresponding conductors 2" and 4" which traverse the bottom surface of the tablet by a sheet of magnetic shielding 6, as shown in FIG. 3. This sheet of magnetic shielding 6 serves to prevent the induction of magnetostrictive waves in the magnetostrictive element 22 directly by means of the flux-producing element 10. The flux-producing element will induce a current pulse in at least one proximal conductor of each grid 2 and 4 on the tablet top surface, which pulses will likewise energize the conductors 2" and 4" arranged on the tablet bottom surface, as a result of which two pairs of oppositely propagating magnetostrictive waves will be induced in the magnetostrictive element without interference from the flux-producing element. The sheet of magnetic shielding 6 forms the central layer of the tablet, with electrical conductors 4, 4" arranged adjacent the upper and lower surfaces of sheet 6 in a wrapped-around relationship, as previously described. The electrical conductors 2, 2" are arranged adjacent the top and bottom surfaces of the data tablet in a wrapped-around relationship, transverse to electrical conductors 4, 4" respectively. For example, in one embodiment of the tablet, a sheet of material in which connected conductors 4, 4', 4" are embedded will be wrapped around one edge of the sheet of shielding 6, and another sheet of material in which connected conductors 2, 2', 2" are embedded will be wrapped around a second edge of sheet 6. As will be apparent to a practitioner having ordinary skill in the art, a layer of insulating material (not shown in FIG. 9A) will be arranged to form the outermost surfaces of the tablet, thereby electrically insulating the electrical conductors from the pointer.

The pointer 8 (see FIG. 1) is freely movable over the top surface of the data tablet. This pointer can be either a stylus or a cursor, and includes a circular flux-producing element 10 having an axis normal to the plane of the conductors 2 and 4. The flux-producing element 10, as a result of its closely spaced proximity to the surface of the tablet, is inductively coupled to the individual conductor portions arrayed near the top surface of the tablet. The flux-producing element 10 acts as the primary of a transformer with each of the grid conductors 2 and 4 serving as secondaries. The flux-producing element 10 is connected in series with a power supply. The coil is momentarily grounded, which causes the existing field to collapse, thereby inducing a field of opposite polarity into the grid of conductors. This induced field causes current to flow in the conductors located proximal to the flux-producing element.

The cursor is pulsed by cursor firing circuit 14, which is connected to one contact of switch 18. The other contact of switch 18 is connected to fiducial firing circuit 16 to be described in detail below. The switch is controlled by control and logic circuitry 20, which also outputs trigger pulses to firing circuits 14 and 16 by way of amplifier 19.

Figure 4:
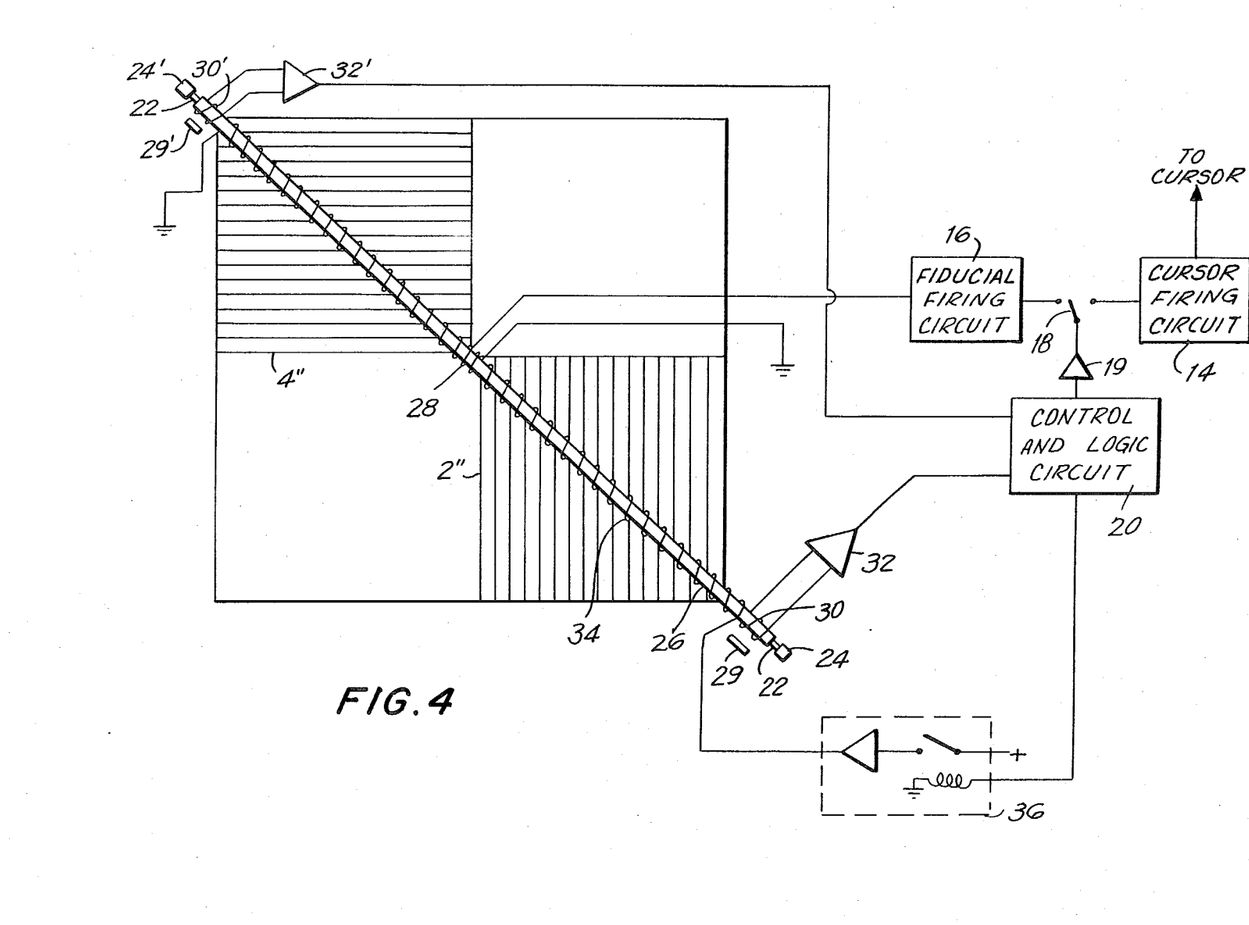
FIG. 4 is a bottom view of the compressed conductor grids and the diagonal magnetostrictive element of an embodiment for simultaneous X and Y coordinate determination with the firing circuits and logic and control network indicated in schematic form.

FIG. 4 shows the diagonal magnetostrictive elements 22 and associated components in detail. Supported at either of its ends by damping blocks 24 and 24' is an elongated magnetostrictive element 22 in the form of a wire which has an axis diagonal to and which is supported in close proximity or in physical contact with, but does not make electrical contact with, the electrical conductors 2" and 4". The magnetostrictive element 22 is formed from any composition which exhibits magnetostrictive properties, for example, a nickel-chromium-vanadium or iron-cobalt-vanadium alloy. Upon induction of an electrical current through any of the electrical conductors 2 and 4 by flux-producing element 10, the resulting electrical magnetic field in the region where the energized conductors are proximate to the magnetostrictive element 22 generates vibration or strain waves in the magnetostrictive element. A first pair of strain waves propagate along the axis of the magnetostrictive element 22 in opposite directions from the point which is proximal to the pulsed conductor 2" and a second pair of strain waves propagate from the point proximal to the pulsed conductor 4". The magnetostrictive element 22 is sheathed in an elongated tubular jacket or sleeve 26 which is preferably made of a low-friction material. Teflon has been found to be a material suitable for sheathing the magnetostrictive element 22 without substantial damping of the magnetostrictively induced strain waves.

At predetermined positions at each end of the magnetostrictive element 22 there are provided inductive sensor coils 30 and 30' which circumscribe the magnetostrictive element 22 and which are connected to the inputs of respective preamplifiers 32 and 32'. Permanent magnets 29 and 29' are disposed in predetermined spaced relationship to and with their major axes parallel to the axis of the magnetostrictive element 22. The sensor coil 30 and the preamplifier 32 form a circuit for outputting an electrical signal (i.e. an amplified pulse) in response to the detection of a change in the magnetic field of the permanent magnet 29 resulting from the propagation of a strain wave past this point on the magnetostrictive element 22. In a similar manner, sensor coil 30' and preamplifier 32' form a circuit for outputting an amplified pulse in response to arrival of an oppositely propagating strain wave. The permanent magnets 29 and 29' serve to magnetically bias the end portions of the magnetostrictive element 22 within the respective sensor coils 30 and 30' so that the output of the preamplifiers 32 and 32' in response to the arrival of a propagating magnetostrictive strain wave has a predetermined polarity and amplitude range. Alternatively, the inductive sensing coil can be replaced by a piezoelectric element.

The entire length of the sheath or jacket 26 is wrapped within a conducting helical bias coil 34 preferably formed from a good conductor such as copper. One end of the bias coil 34 is connected to the output of a bias signal generator 36. The opposite end of the bias coil is connected to ground. Application of a bias signal from the generator 36 to the coil 34 sets up an electromagnetic field around the magnetostrictive element which restores the magnetostrictive element 22 to an initial operating condition and compensates for hysteresis or other external effects which can cause the magnetostrictive element 22 to vary in its strain wave propagational response to an electric current induced in the conductors 2" and 4". Biasing of the magnetostrictive element 22 takes place before the pointer measurement cycle is initiated. The biasing operation may be performed before each measurement cycle or periodically between groups of several measurement cycles. The biasing can be done independently of the timing of the measurement signals.

The arrangement as depicted in FIG. 4 is suitable for determining the position of pointer 8 with respect to a pair of mutually orthogonal coordinate axes. When the flux-producing element 10 of pointer 8 is pulsed, a current pulse is induced in at least one of the horizontal electrical conductors 2 and at least one of the vertical electrical conductors 4. As previously described, each current pulse in turn induces oppositely propagating strain waves in the diagonal magnetostrictive element 22. Each pair of strain waves induced will propagate from a point along the magnetostrictive element which is proximal to the pulsed electrical conductor. The first of the four strain waves will propagate from the first proximal point of induction to the point along the magnetostrictive element at which the sensor coil 30 is arranged, and a second strain wave will propagate from the second proximal point of induction to the point along the magnetostrictive element at which the sensor coil 30' is arranged. Due to the uniformity of the magnetostrictive material, the time of travel of each sensed strain wave will be proportional to the distance travelled. Because the speed of propagation of each induced strain wave until sensing by a sensor coil remains constant, the time of propagation of the first and second strain waves can be determined and then used to calculate the corresponding position coordinate of the pointer. In accordance with the embodiment depicted in FIG. 4, the third and fourth induced strain waves, which propagate toward each other, are non-informational in the sense that they are not used to determine the position coordinates.

As will be discussed in greater detail below, the cursor firing circuit 14 produces a pulse in the flux-producing element 10 in response to a control signal from the control and logic circuit 20, by way of amplifier 19, when switch 18 is in the cursor firing position. The control and logic circuit 20 comprises a pair of counters 42 and 42' (see FIG. 6) which begin to count simultaneously with the firing of the cursor and which stop counting in response to the output of a signal by the associated preamplifiers 32 and 32', indicating arrival of the strain waves induced in magnetostrictive element 22. The counter will be described in detail in connecton with the discussion of FIG. 7. Each count represents the propagation time of the cursor-induced strain wave sensed by the sensor coil and is used to determine the respective position coordinate of the pointer. The counting rate of the counter is controlled by a clock 44 (see FIG. 6) of predetermined frequency.

Circumscribing the magnetostrictive element 22 at a predetermined reference position in the middle, between the compressed X and Y conductor grids, is a fiducial signal generating induction coil 28 (see FIG. 4). This fiducial coil is connected to the fiducial firing circuit 16. The fiducial coil 28 serves to induce a pair of oppositely propagating strain waves in magnetostrictive element 22 which will travel toward the respective ends of the magnetostrictive element and be sensed by sensor coil situated thereat. The pulsing of the fiducial coil 28 will take place prior to the pulsing of the flux-producing element 10. As will be described in greater detail below, each counter is started at the time the fiducial coil is fired and is then stopped upon arrival of the fiducial-induced strain wave at the corresponding sensor coil. The time of propagation of the strain wave induced by the fiducial coil 28 can be used to automatically calibrate the respective X and Y grids of the digitizer whereby temperature effects can be compensated for. The fiducial firing circuit 16 will pulse the fiducial coil 28 in response to a control signal output by control and logic circuit 20, by way of amplifier 19, when switch 18 is in the fiducial firing position. Thus, switch 18 can be used to control the firing of the fiducial coil 28 and the flux-producing element 10 in alternating sequence.

Under standard temperature conditions a strain wave induced by the fiducial coil 28 will propagate for a predetermined amount of time before arrival at the corresponding sensor coil. The known propagation time under standard conditions can be compared with the propagation time of the fiducial-induced strain wave under actual conditions to determine whether a correction is required to compensate for temperature effects. This correction can be performed in a known way in accordance with the following ratiometric proportionality:

$$t_{std}/t_{fid} = t_{cor}/t_{cur} \tag{1}$$

where $t_{std}$ is the time of propagation for the fiducial-induced strain wave under standard conditions, $t_{fid}$ is the propagation time of the fiducial-induced strain wave under actual conditions, $t_{cur}$ is the propagation time of the cursor-induced strain wave under actual conditions, and $t_{cor}$ is the corrected propagation time representing the theoretical propagation time of the cursor-induced strain wave under standard conditions.

Thus, when the pointer is located in proximity to the top surface of the data tablet (see FIG. 1) and pulsed by the cursor firing circuit 14, a current pulse will be induced in at least one electrical conductor 2 and in at least one electrical conductor 4, which current pulses will simultaneously occur in conductors 2″ and 4″. It should be noted that the compression of the respective grids of conductors takes place in edge conductors 2′ and 4′ respectively, as depicted in FIG. 2A, so neither the conductors 2′ nor the conductors 4′ are mutually parallel. The current pulses thereby produced in the conductors 2″ and 4″ arranged on the bottom surface of the data tablet will in turn induce respective pairs of oppositely propagating strain waves in the diagonal magnetostrictive element 22.

The control and logic circuit 20 (see FIG. 6) will respond to only the respective first signals output by preamplifiers 32 and 32′. Thus, the first signal output by preamplifier 32 will be in response to the first strain wave to arrive at sensor coil 30. Correspondingly, the first signal output by preamplifier 32′ will be in response to the first strain wave to arrive at sensor coil 30′. These output signals will serve to stop the respective counters 42 and 42′ in the control and logic circuit 20. Any output signal subsequently produced as a result of the detection of non-informational strain waves will be ignored.

Figure 6:
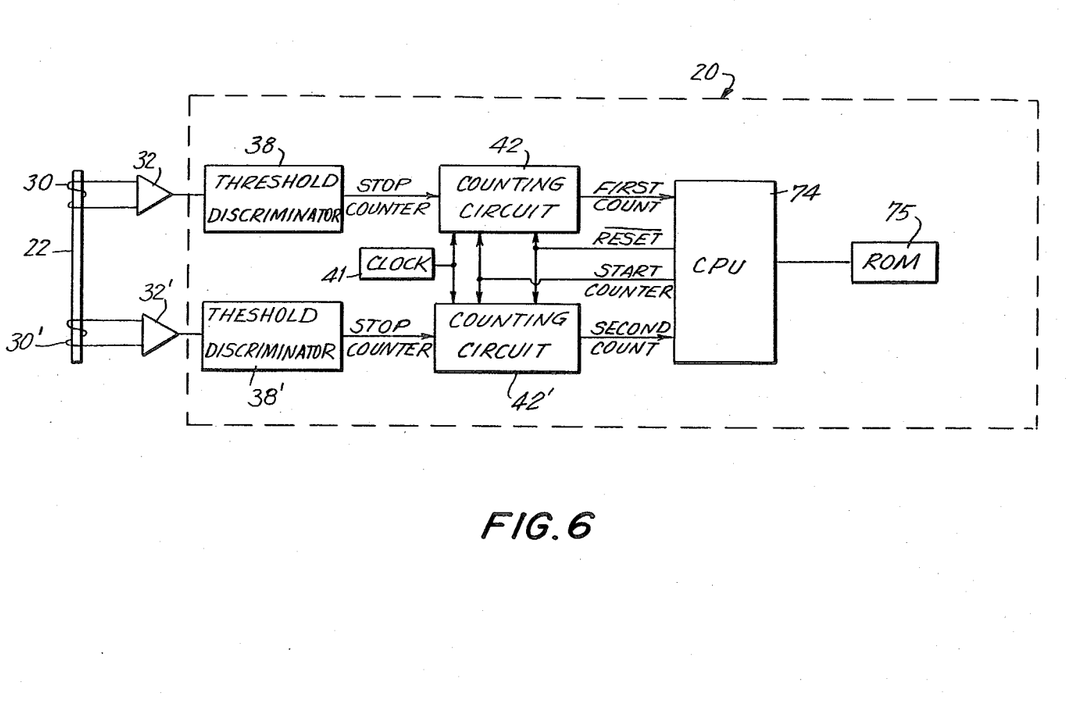
FIG. 6 is a schematic block diagram of the electrical circuitry suitable for simultaneous coordinate determination in accordance with the present invention.

In one embodiment of the control and logic circuit 20 in accordance with the invention, the so-called X and Y strain waves are picked up by the sensor coils 30, 30′ and then amplified by the respective preamplifiers 32, 32′. The amplified pulses are then applied to respective threshold discriminators 38 and 38′ as depicted in FIG. 6. The threshold discriminators operate to sense the first zero crossing after the achievement of a minimal threshold and provide an output pulse corresponding to the occurrence of the zero crossing. The outputs of the threshold discriminators 38 and 38′ serve as STOP COUNTER signals, which are output to the respective counting circuits 42 and 42′. Clock 44 simultaneously outputs clocking signals to both counting circuits 42 and 42′. The respective X and Y counts are initiated simultaneously in response to the output of a START COUNTER signal by the central processing unit (CPU) 74, which outputs the START COUNTER signal simultaneously with the firing of the flux-producing element 10 by way of a TRIGGER signal. The respective X and Y counts are stopped upon receipt by the counting circuits 42 and 42′ of a STOP COUNTER signal from respective threshold discriminators 38 and 38′. The values at which the respective counts are stopped in counting circuits 42 and 42′ constitute the X and Y counts, which are output to the CPU 74. These values are then processed by the CPU 74 in accordance with a program stored in ROM 75 to determine the position coordinates of the pointer. Meanwhile, the counters are reset to zero in response to the output of a RESET signal by the CPU 74.

Figure 5:
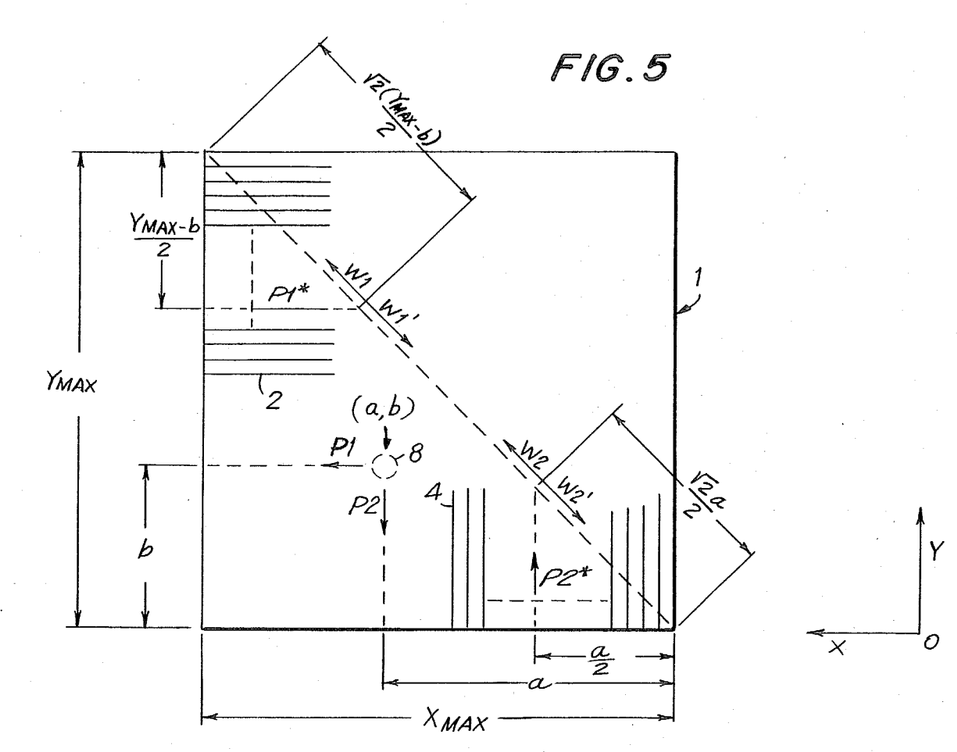
FIG. 5 is a diagrammatic depiction of the paths of travel of the induced pulses and magnetostrictive waves in accordance with the embodiment of FIG. 4.

The processing of data by CPU 74 during simultaneous determination of the position coordinates takes place in accordance with the scheme shown in FIG. 5, which is a bottom view of the paths of travel of the respective pulses and strain waves. It should be noted that for purposes of this illustration, the positive X coordinate axis will be directed from right to left, while the positive Y coordinate axis will be directed from bottom to top. For purposes of illustration, it will be further assumed that the respective pluralities of spatially compressed electrical conductors each occupy an opposing quadrant of the data tablet bottom surface. Therefore, the spatial compression of the conductors is by a factor of two.

The pointer 8 (indicated by the dashed circle in FIG. 5) is shown at position (a, b) along the top surface of the tablet. When the flux-producing element 10 of pointer 8 is pulsed, current pulses P1 and P2 will be respectively produced in at least one electrical conductor 2 and at least one electrical conductor 4. Simultaneous with the production of current pulses in the conductors 2 and 4 on the top surface of the data tablet, current pulses will be produced in the corresponding conductors 2″ and 4″ on the bottom surface of the tablet. These pulses are denoted as P1* and P2* in FIG. 5. Pulses P1* and P2* will in turn induce respective strain waves W1, W1′, W2, and W2′. The oppositely propagating strain waves W1′ and W2 are noninformational in this embodiment for simultaneous position coordinate determination. In accordance with the geometric relationship shown in FIG. 5, it can be seen that the strain wave W1 will travel a distance $\sqrt{2}(Y_{max}-b)/2$ and the strain wave W2′ will travel a distance $\sqrt{2}a/2$, remembering that the width of the respective grid of spatially compressed conductors is assumed to be equal to one-half of the corresponding dimension of the active data surface. In accordance with the program stored in ROM 75, CPU 74 calculates the position coordinates a and b of the pointer using the following relationships:

$$a = \sqrt{2} \, V_{prop} \cdot N_1/f_{clk} \tag{2}$$

$$b = Y_{max} - \sqrt{2}\ V_{prop} \cdot N_2/f_{clk} \tag{3}$$

where $V_{prop}$ is the velocity of propagation of a strain wave in the magnetostrictive element, $f_{clk}$ is the clocking frequency, $N_1$ is the first count, $N_2$ is the second count, and $Y_{max}$ is the maximum Y coordinate for the particular data tablet. The CPU 74 will be programmed to recognize which count corresponds to the X coordinate and which count corresponds to the Y coordinate in dependence o which preamplifier output is being processed.

Figure 7:
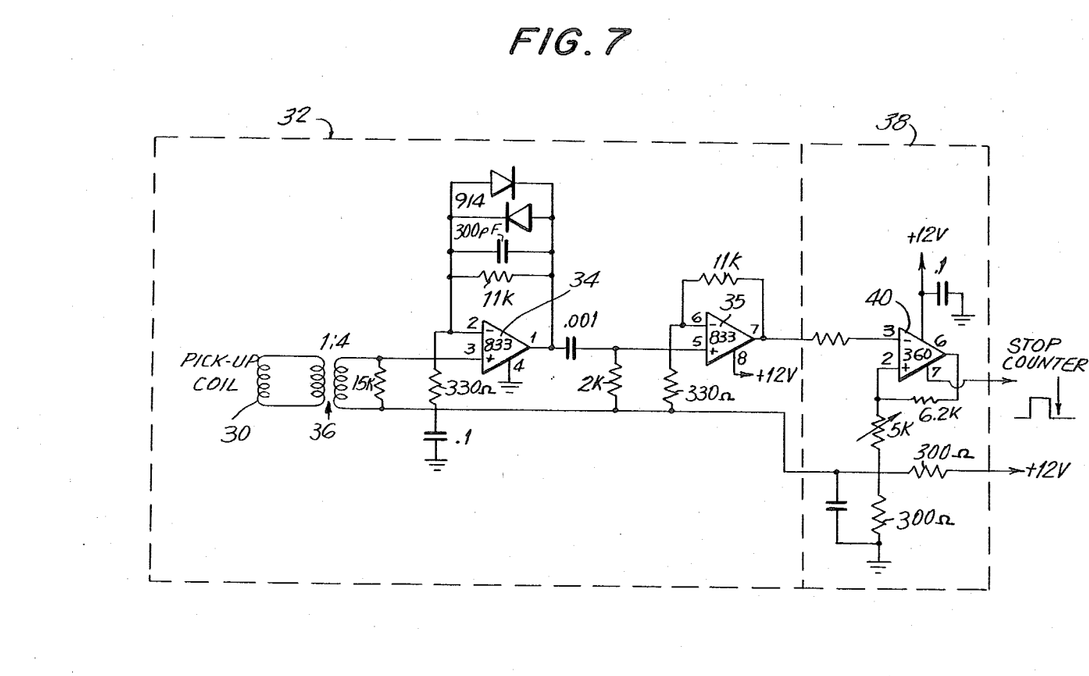
FIG. 7 is a detailed circuit diagram of the preamplifier and threshold discriminator schematically depicted in FIG. 6.

FIG. 7 shows the detailed circuitry comprising preamplifier 32 and threshold discriminator 38. Preamplifier 32 comprises a 1:4 transformer 36 connected across the terminals of sensing or pick-up coil 30. A 15-kiloohm resistor is connected across the output terminals of transformer 36. One terminal of the transformer secondary is directly connected to the plus terminal of operational amplifier 34. The other terminal of the transformer secondary is connected to the minus terminals of operational amplifiers 34 and 35 by way of respective resistors. The output terminal of operational amplifier 34 is connected to the plus terminal of operational amplifier 35 by way of a capacitor. Pre-amplifier 32 operates such that operational amplifier 35 outputs an amplified analog signal in response to the induction of a pulse in sensor coil 30. This analog signal is converted into a digital pulse by threshold discriminator 38, which comprises a comparator 40. Threshold discriminator 38 operates to output the STOP COUNTER signal in response to the receipt of an analog signal from preamplifier 32 which equals or exceeds a predetermined voltage level.

Figure 8:
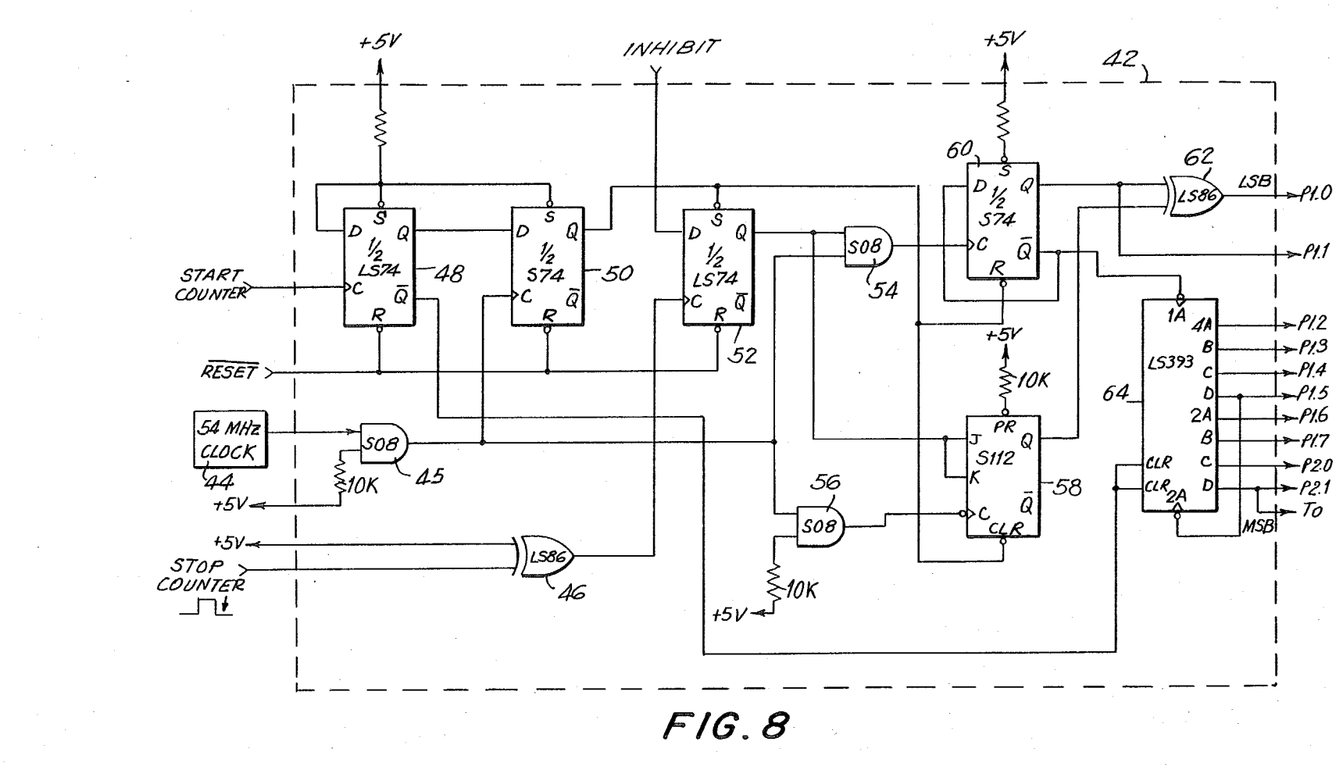
FIG. 8 is a detailed circuit diagram of the counting circuit schematically depicted in FIG. 6.

One embodiment of. the counting circuit 42 is shown in FIG. 8. Counter circuit 42 comprises three D latches 48, 50 and 52 having reset terminals which are connected to receive the RESET signal from CPU 74. The C terminal of latch 48 is connected to receive the START COUNTER signal from CPU 74. The D terminal of latch 52 is connected to receive the INHIBIT signal from CPU 74, while the C terminal of latch 52 is connected to receive the STOP COUNTER signal by way of AND gate 46. A 54-MHz clock 44 outputs clocking signals to the C terminal of latch 50 and to an input terminal of AND gate 54 by way of AND gate 45. The other input terminal of AND gate 54 is connected to the Q terminal of latch 52. The output terminal of AND gate 54 is in turn connected to the C terminal of latch 60. The Q terminal of latch 60 is connected to an input terminal of EXCLUSIVE OR gate 62, while the Q terminal is connected to the D terminal of latch 60 as well as to the dual binary counter 64. The other input terminal of EXCLUSIVE OR gate 62 is connected to the Q terminal of JK flip-flop 58. The J and K terminals of flip-flop 58 are connected to the Q terminal of latch 52, the C terminal of flip-flop 58 is connected to the output terminal of AND gate 56, and the clear terminal of flip-flop 58 is connected to the Q terminal of latch 50. The input terminals of AND gate 56 are respectively connected to the output terminal of AND gate 45 and to a +5-volt voltage source by way of a 10-kiloohm resistor. Counting circuit 42 begins to count in response to the START COUNTER signal received by latch 48. The counting rate is determined by the frequency of clock 44. The counting circuit 42 stops the count in response to the receipt of a STOP COUNTER signal by EXCLUSIVE OR gate 46, the output terminal of which is connected to the C terminal of latch 52, provided that the D terminal of latch 52 is not enabled by an INHIBIT signal from CPU 74. Counting circuit 42 then outputs a plurality of bits representing the count to the CPU 74, with the output of EXCLUSIVE OR gate 62 representing the least significant bit (LSB) and the output of the 2D terminal of dual binary counter 64 representing the most significant bit (MSB).

Figure 9:
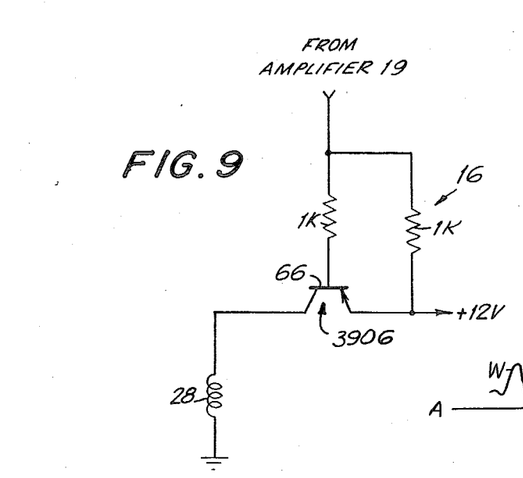
FIG. 9 is a detailed circuit diagram of the fiducial firing circuit schematically depicted in FIG. 1.

FIG. 9 is a circuit diagram of the fiducial firing circuit 16 in accordance with the invention. Becaus of the close proximity of the fiducial coil 28 to the magnetostrictive element 22, the fiducial coil does not require a large current in order to produce a useable pulse in the magnetostrictive element. Therefore, the fiducial firing circuit 16 comprises a simple transistor 66 for firing the fiducial coil 28 in response to a signal from amplifier 19.

Figure 10:
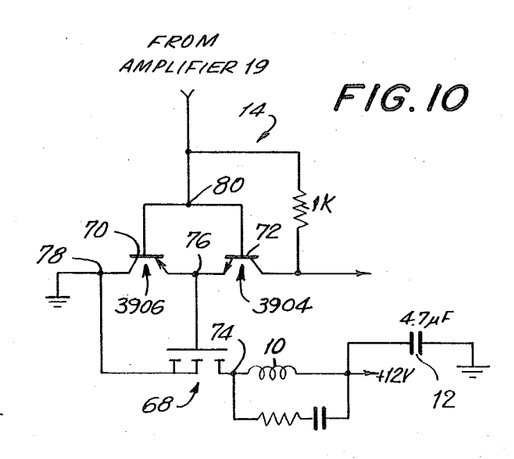
FIG. 10 is a detailed circuit diagram of the cursor firing circuit schematically depicted in FIG. 1.

FIG. 10 is a circuit diagram of the cursor firing circuit 14 in accordance with the invention. The prior art cursor firing circuit comprised a silicon controlled rectifier, the anode of which is connected to a charging capacitor. In the cursor firing circuit or pointer pulser of the present invention, these components have been replaced by a power MOSFET 68. The use of a MOSFET greatly enhances the current pulse applied across the pointer, as a result of which the pointer yields greater signal amplitude. In addition, the silicon controlled rectifier circuit of the prior art greatly reduced the sample rate. As shown in FIG. 10, the cursor firing circuit comprises series-connected transistors 70 and 72 having their bases connected to a common junction 80, and power MOSFET 68 having terminals connected to junctions 74, 76, and 78. Power MOSFET 68 pulses the flux-producing element 10 in response to the receipt of an output signal from amplifier 19.

Figure 11:
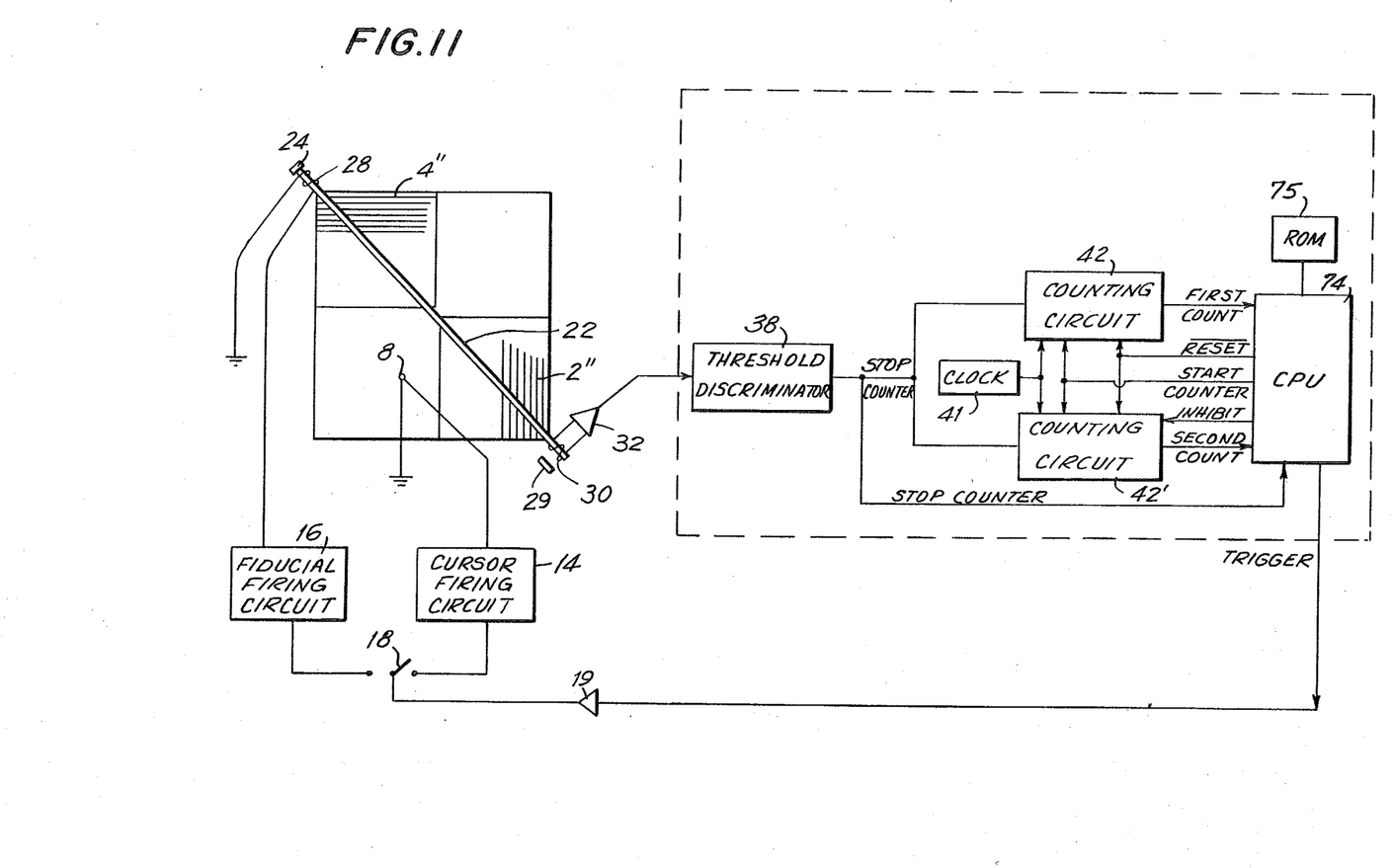
FIG. 11 is a combined bottom view of the data tablet and schematic depiction of the associated electrical circuitry in accordance with a second embodiment for simultaneous coordinate determination.

Although the embodiment of the invention depicted in FIGS. 4 and 6 is operational, the preferred embodiment for performing simultaneous coordinate determination is as shown in FIG. 11. This embodiment is an improvement over that depicted in FIGS. 4 and 6 in that only one sensor coil 30, one preamplifier 32, and one threshold discriminator 38 are required. Whereas in the embodiment of FIG. 4 the strain waves W1 and W2' (see FIG. 5) are used to determine the X and Y coordinates of the pointer, in the preferred embodiment of FIG. 11 the strain waves W1' and W2' (or W1 and W2 if the sensor coil is placed at the opposite end of the magnetostrictive element) are used. Those practitioners having ordinary skill in the art would have no difficulty in formulating the necessary mathematical equations based on the geometric relationships of the uncompressed conductors 2 and 4, the spatially compressed conductors 2" and 4", and the diagonal magnetostrictive element 22. Recalling that, for the purpose of facilitating the description of the invention, we have assumed that the respective grids of compressed conductors 2" and 4" are arranged to extend over opposing quadrants of the tablet bottom surface, the position coordinates can be determined in accordance with the following relationships:

$$a = \sqrt{2}\ V_{prop} \cdot N_1/f_{clk} \tag{4}$$

$$b = \sqrt{2}\ V_{prop} \cdot N_2/f_{clk} - Y_{max} \tag{5}$$

where $Y_{max}=X_{max}$ for a square tablet and $V_{prop}$, $N_1$, $N_2$, and $f_{clk}$ represent the same variables previously defined in connection with equations (2) and (3).

The embodiment of FIG. 11 also differs from that of FIG. 4 in the location of the fiducial coil for calibration of the tablet. In FIG. 2 the fiducial coil 28 is placed between the grids of compressed conductors to enable independent calibration for each coordinate. In contrast, in the preferred embodiment having only one sensor coil 30, the fiducial coil 28 must be located at the opposite end of the magnetostrictive element 22.

In the preferred embodiment of FIG. 11, the preamplifier 32 will output respective amplified pulses in response to detection of the arriving strain waves W1' and W2' (see FIG. 5) by sensor coil 30. In response to receipt of each amplified pulse, the threshold discriminator 38 will ouiput first and second STOP COUNTER signals to the counters 42 and 42'. The counters 42 and 42' are controlled by the CPU 74 such that both start to count in response to a START COUNTER signal ouput by CPU 74 simultaneously with the TRIGGER signal output to the cursor firing circuit 14. Counter 42 will stop counting in response to receipt of the first STOP COUNTER signal from threshold discriminator 38, i.e. counter 42 does not receive an INHIBIT signal from CPU 74. The second STOP COUNTER signal from threshold discriminator 38 will have no effect on counter 42. Counter 42' is inhibited from stopping its counting upon receipt of the first STOP COUNTER by the INHIBIT signal (see FIG. 8) output by CPU 74. As can be seen in FIG. 11, the STOP COUNTER pulses are also sent to CPU 74, which is programmed to output the INHIBIT signal to counter 42' only during the time interval between output of the TRIGGER signal and receipt by CPU 74 of the first STOP COUNTER signal. After the first STOP COUNTER has been received by CPU 74, the inhibit line to counter 42' is disabled and counter 42' will stop counting in response to receipt of the next (i.e. second) STOP COUNTER signal. The first and second counts ($N_1$ and $N_2$) attained by respective counters 42 and 42' are output to CPU 74, which processes this data in accordance with equations (4) and (5) to obtain the X and Y coordinates of the pulsed pointer 8.

Figure 12:
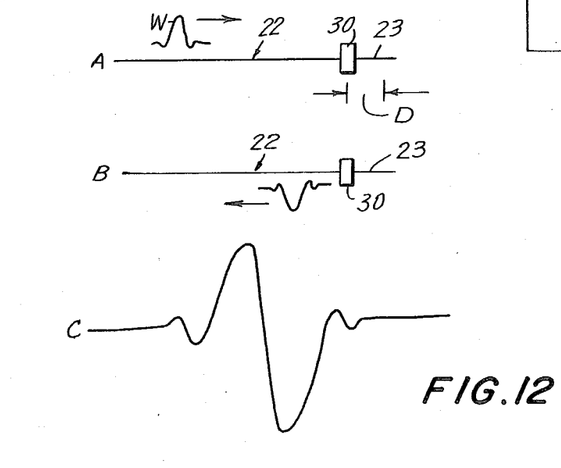
FIG. 12A–C is a diagrammatic depiction of an induced strain wave propagating toward the sensor coil, a reflected strain wave propagating from the end of the magnetostrictive element, and the summed induced and reflected strain waves as sensed by the sensor coil.

A further difference between the preferred embodiment of FIG. 11 and the embodiment of FIGS. 4 and 6 lies in the fact that the magnetostrictive element 22 in the former embodiment has only one damping block, the end on which sensor coil 30 is arranged being suspended freely in space to enable "tuning" of the magnetostrictive element. Because the free end 23 (see FIG. 12A) of the magnetostrictive element 22 is not mounted in a damping block, the incoming strain wave W will be reflected from the free end, and will propagate through the sensor coil 30 and toward the damping block 24 at the opposite end. By adjusting the length D of the free end 23 extending beyond the sensor coil 30, the reflected strain wave can be added to the incoming strain wave such that the signal peak-to-peak amplitude of the wave sensed by sensor coil 30 is doubled, thereby increasing proximity.

The length of magnetostrictive element 22 which extends beyond the sensor coil 30 is directly proportional to the pulse width $I_c$ of the current pulse which excites the cursor. The rule of thumb formula is that for each microsecond of current pulse width, 3/32 inch of magnetostrictive element must extend beyond the sensor coil (as measured from the center of the sensor coil).

Thus, if $I_c=2$ microseconds, then D must equal 3/16 inch.

This phenomenon occurs because the reflected waveform is 180° out of phase with respect to the incoming waveform. By selecting an appropriate length D for free end 23, the waves can be "tuned" such that the trailing edge of the incoming wave and the leading edge of the reflected wave will add together, yielding one pulse with a greater peak-to-peak amplitude (see FIG. 12C).

In the preferred embodiment, $V_{prop}=5000$ meters/second=0.01 inch in 50 nanoseconds. If the current pulse width $I_c=2$ microseconds, then the distance d traveled by the propagating strain wave during this time equals 0.4 inch. Using the relationship d=2D, we get that $D\approx3/16$ inch.

The control and logic circuitry shown in FIGS. 6 and 11 is suitable for simultaneously determining both the X and Y position coordinates of the pointer in response to a single pulsing of the flux-producing element. Alternatively, the X and Y coordinates can be determined in a sequential manner using the control and logic circuit 20 shown in FIG. 13. The control and logic circuit 20 depicted in FIG. 13 differs from that depicted in FIG. 6 in that only one sensor coil 30, one preamplifier 32, one threshold discriminator 38, and one counting circuit 42 are required. The control and logic circuit 20 of FIG. 13 differs from that depicted in FIG. 11 in that only one counter 42 is required. A first TRIGGER signal output by CPU 74 will pulse the flux-producing element 10 when switch 18 is in the cursor firing position, with the result that a first amplified pulse will be output by preamplifier 32. A second amplified pulse will be output by the preamplifier 32 in response to a second TRIGGER signal from CPU 74. The counter is suitably controlled such that after the first TRIGGER signal, the first amplified pulse serves as the STOP COUNTER signal, but after the second TRIGGER signal, the second amplified pulse serves as the STOP COUNTER signal. By using this sequential pulsing method, the number of elements comprising logic and control circuit 20 can be reduced.

Figure 13:
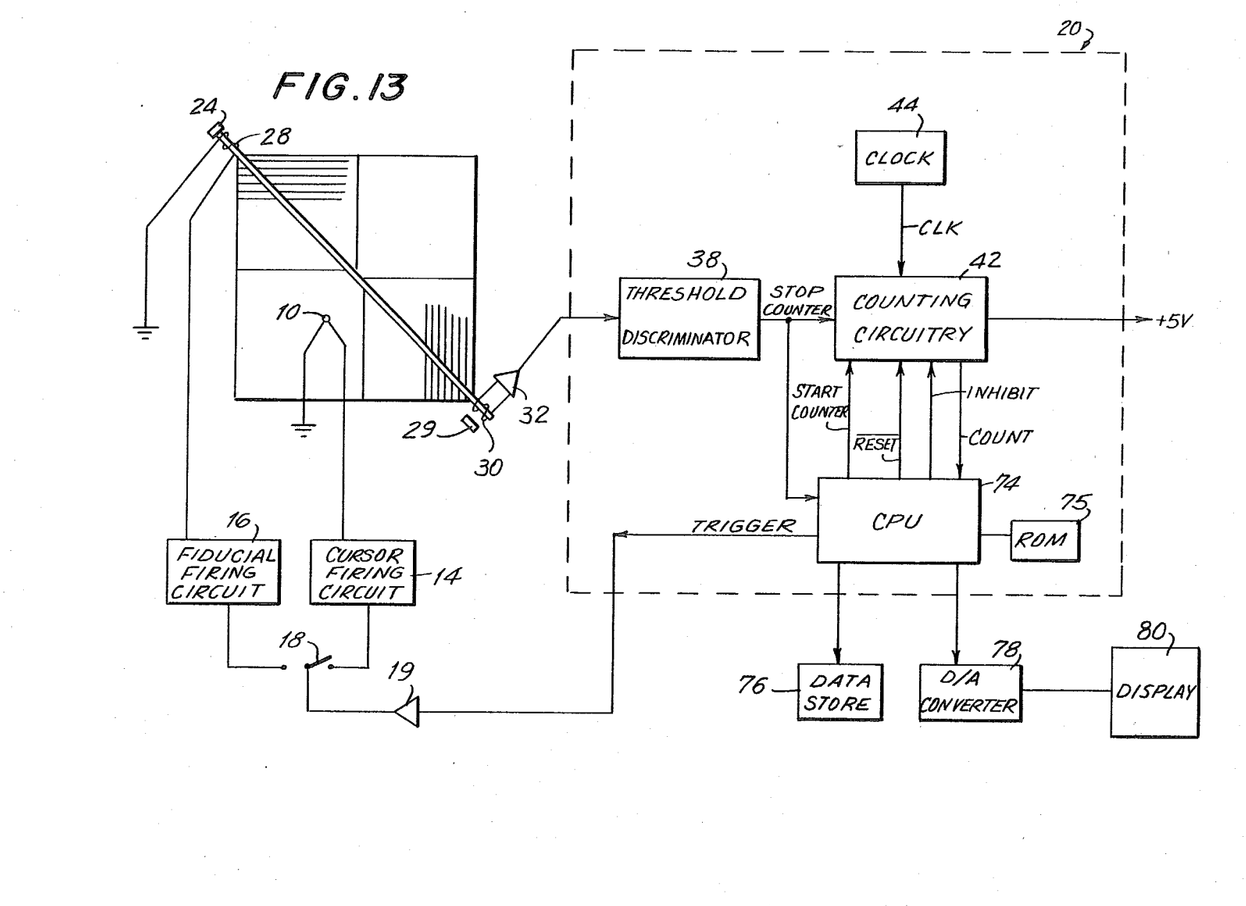
FIG. 13 is a combined bottom view of the data tablet and schematic depiction of the associated electrical circuitry in accordance with an embodiment for sequential coordinate determination.

In accordance with the embodiment depicted in FIG. 13, the CPU 74 will output a START COUNTER signal simultaneously with the output of each TRIGGER signal. Following the output of the first TRIGGER signal, the pointer will be pulsed and preamplifier 32 will output first and second amplified pulses which will be passed to threshold discriminator 38, in response to which respective STOP COUNTER signals will be output to counting circuit 42. Referring to FIG. 5, it can be seen that in the embodiment for sequential coordinate determination, which comprises a single sensor coil 30, either induced strain waves W1 and W2 or W1' and W2' are informational (i.e. the amplified pulses induced by these strain waves are used to determine the pointer coordinates) depending on at which end of the magnetostrictive element 22 the sensor coil 30 is arranged. The counting circuit 42 will stop counting in response to the first STOP COUNTER signal, with the second STOP COUNTER signal having no effect. This first count will then be output to CPU 74 and temporarily stored in random access memory therein. CPU 74 will then output a RESET signal to counting circuit 42 for resetting the count to zero. A second TRIGGER signal will then be output by CPU 74 simultaneously with a second START COUNTER signal, following which respective STOP COUNTER signals will be output by threshold discriminator 38 in response to the first and second amplified pulses output by preamplifier 32. This time, however, the counting circuit will continue to count until the second STOP COUNTER signal is received. In this case, as shown in FIG. 13, the CPU 74 outputs an INHIBIT signal to counting circuit 42 during the time when the first STOP COUNTER signal is received. This INHIBIT signal renders the first STOP COUNTER signal ineffective. As depicted in FIG. 8, the INHIBIT signal is output to the D terminal of latch 52 while the STOP COUNTER signal is output to the C terminal of latch 52. In response to the first STOP COUNTER signal, the CPU 74 terminates the output of the INHIBIT signal so that the second STOP COUNTER signal will be effective, thereafter stopping the count in counting circuit 42. This second count will be output to CPU 74. CPU 74 will then process the first and second counts stored in random access memory, in accordance with a routine stored in ROM 75, to determine the position coordinates of pointer 8. This routine will reflect the geometric relations of the diagonal magnetostrictive element and the compressed grids.

The foregoing description of the preferred embodiments is presented for illustrative purposes and is not intended to limit the scope of the invention as defined in the appended claims. Modifications may be readily effected by one having ordinary skill in the art without departing from the spirit and scope of the inventive concept herein disclosed.

What is claimed is:

1. An automatic position coordinate determining device comprising:
   (a) a data tablet having a top surface and a bottom surface, and comprising a sheet of electromagnetic shielding having a periphery, a first plurality of electrical conductors, each conductor of said first plurality having first and second conductor portions arranged above and below said shielding respectively, and having a third conductor portion wrapped around said periphery of said shielding and connecting said first and second conductor portions, said first conductor portions being parallel, equidistantly spaced, and substantially transverse to a first coordinate axis, and a second plurality of electical conductors, each conductor of said second plurality having first and second conductor portions arranged above and below said shielding respectively, and having a third conductor portion wrapped around said periphery of said shielding and connecting said first and second conductor portions, said first conductor portions of said second plurality of conductors being parallel, equidistantly spaced, and substantilly transverse to a second coordinate axis, said first and second conductor portions of said first plurality of conductors being electrically insulated from said first and second conductor portions respectively of said second plurality of conductors;
   (b) a magnetostrictive element arranged below said shielding and proximal to said second conductor portions, said magnetostrictive element being inductively coupled to each of said second conductor portions such that a pair of oppositely propagating strain waves are produced in said magnetostrictive element in response to a current pulse in any one of said first conductor portions;
   (c) a pointer movable over said top surface of said tablet and including a flux-producing element which is capable of being inductively coupled to at least one of said first conductor portions of said first plurality of electrical conductors and to at least one of said first conductor portions of said second plurality of electrical conductors when said pointer is proximal to said top surface such that a current pulse is induced in said inductively coupled first conductor portions in response to a current pulse in said flux-producing element;
   (d) a current source electrically connected to output a current pulse to said flux-producing element; and
   (e) a sensor means arranged at a reference position proximal to said magnetostrictive element, said sensor means being capable of outputting a pulsed signal in response to detection of the arrival of a propagating strain wave at said reference position.

2. The automatic position coordinate determining device as defined in claim 1, further comprising a counting means operatively connected to begin counting in response to the output of a current pulse by said current pulse source, wherein said counting means is operatively connected to stop counting in response to the output of a pulsed signal by said sensor means.

3. The automatic position coordinate determining device as defined in claim 2, further comprising memory means for storing a program and calculating means for performing a calculation in accordance with said program, said calculating means being connected to receive signals representing said stopped count from said counting means, wherein said program enables said calculating means to calculate a position coordinate of said pointer from the value of said stopped count.

4. The automatic position coordinate determing device as defined in claim 2, further comprising amplifiying means for amplifying the pulsed signals output by said sensor means, and detecting means connected to said amplifying means and to said counting means for detecting an amplified pulsed signal having a characteristic value greater than a predetermined threshold value and outputting a stop counter signal to said counting means in response to said detection.

5. The automatic position coordinate determining device as defined in claim 1, wherein said sensor means comprises an inductive element inductively coupled to said magnetostrictive element for producing a voltage signal in response to the arrival of a propagating strain wave at said reference position.

6. The automatic position coordinate determining device as defined in claim 5, further comprising means for applying a constant magnetic field at said reference position.

7. The automatic position coordinate determining device as defined in claim 1, wherein said sensor means comprises a piezoelectric element coupled to said magnetostrictive element to allow the propagation of a strain wave from said magnetostrictive element to said piezoelectric element for producing a voltage in response to the arrival of a propagating strain wave at said reference position.

8. The automatic position coordinate determining device as defined in claim 1, wherein said current pulse source comprises a power MOSFET.

9. The automatic position coordinate determining device as defined in claim 1 further comprising calculating means for outputting start counter signals and an inhibit signal in accordance with a predetermined routine and counting means operatively connected to begin counting in response to the output of a start counter signal by said calculating means, wherein said counting means is operatively connected to stop counting in response to the output of a pulsed signal by said sensor means only if said calculating means is not outputting an inhibit signal.

10. The automatic position coordinate determining device of claim 9, further comprising amplifying means for amplifying the pulsed signals output by said sensor means, and detecting means connected to said amplifying means and to said counting means for detecting an amplified pulsed signal having a characteristic value greater than a predetermined threshold value and outputting a disabling signal to said counting means in response to said detection.

11. The automatic position coordinate determining device as defined in claim 1, wherein said second conductor portions of said first plurality of electrical conductors are inductively coupled to a first portion of said magnetostrictive element at equidistantly spaced intervals therealong and said second conductor portions of said second plurality of electrical conductors are inductively coupled to a second portion of said magnetostrictive element at equidistantly spaced intervals therealong such that a first pair of oppositely propagating strain waves are produced in said magnetostrictive element in response to a current pulse in any one of said first conductor portions of said first plurality of electrical conductors and a second pair of oppositely propagating strain waves are produced in said magnetostrictive element in response to a current pulse in any one of said first conductor portions of said second plurality of electrical conductors.

12. The automatic position coordinate determining device as defined in claim 11, further comprising first and second counting means operatively connected to begin counting in response to the output of a current pulse by said current pulse source, wherein said first and second counting means are operatively connected to stop counting in response to the detection of first and second strain waves respectively at said first reference position by said sensor means.

13. The automatic position coordinate determining device of claim 12, further comprising amplifying means for amplifying the pulsed signals output by said sensor means, and detecting means connected to said amplifying means and to said first and second counting means for detecting an amplified pulsed signal having a characteristic value greater than a predetermined threshold value and outputting a stop counter signal to said first and second counting means in response to said detection.

14. The automatic position coordinate determining device of claim 13, further comprising read only memory means for storing a program and calculating means for performing a calculation in accordance with said program, said calculating means being connected to receive respective signals representing said stopped counts from said first and second counting means, wherein said program enables said calculating means to calculate first and second position coordinates of said pointer relative to said first and second coordinate axes from the first and second values of said stopped counts.

15. A data tablet for two-dimensional position coordinate determination having a top surface and a bottom surface, comprising:
(a) a sheet of electromagnetic shielding having a periphery;
(b) a first plurality of electrical conductors, each conductor of said first plurality having first and second conductor portions arranged above and below said shielding respectively, and having a third conductor portion wrapped around said periphery of said shielding and connecting said first and second conductor portions, said first conductor portions of said first plurality of electrical conductors lying substantially transverse to a first coordinate axis;
(c) a second plurality of electrical conductors, each conductor of said second plurality having first and second conductor portions arranged above and below said shielding respectively, and having a third conductor portion wrapped around said periphery of said shielding and connecting said first and second portions, said first conductor portions of said second plurality of electrical conductors lying substantially transverse to a second coordinate axis, said first conductor portions of said first plurality of conductors being electrically insulated from said first conductor portions of said second plurality of conductors; and
(d) a magnetostrictive element arranged below said shielding, said magnetostrictive element being inductively coupled to said second conductor portions of said first and second pluralities of conductors such that oppositely propagating first and second strain waves are produced in said magnetostrictive element in response to a current pulse in any one of said first conductor portions.

16. The data tablet of claim 15, wherein said first conductor portions have a first predetermined spacing, said second conductor portions have a second predetermined spacing, and said third conductor portions are not parallel, said first predetermined spacing being greater than said second predetermined spacing.

17. The data tablet of claim 15, wherein said second conductor portions of said first plurality of conductors do not overlap said second conductor portions of said second plurality of conductors.

18. The data tablet of claim 15, wherein said second conductor portions of said first plurality of conductors are inductively coupled to a first portion of said magnetostrictive element and said second conductor portions of said second plurality of conductors are inductively coupled to a second portion of said magnetostrictive element, said first and second portions having no common portion.

19. A data tablet for two-dimensional position coordinate determination comprising:
(a) a layer of shielding:
(b) an X-Y conductor grid network comprising a first plurality of parallel spaced electrical conductors and a second plurality of parallel spaced electrical conductors arranged in mutually perpendicular relationship on one side of said shielding, said conductors of said first plurality and of said second plurality having a predetermined spacing;
(c) an X conductor grid comprising a third plurality of spaced electrical conductors arranged on the other side of said shielding;
(d) a Y conductor grid comprising a fourth plurality of spaced electrical conductors arranged on said other side of said shielding; and
(e) a linear magnetostrictive element proximally arranged and obliquely disposed with respect to said X and Y conductor grids, wherein said Y conductor grid and said X conductor grid are arranged without overlap, and said first and second portions of said bottom surface comprise separate surface portions, the conductors of said first plurality being respectively electrically connected to the conductors of said third plurality, and the conductors of said second plurality being respectively electrically connected to the conductors of said fourth plurality.

20. A position determining device comprising: a member defining a surface; a first plurality of spaced electrical conductors associated with a first coordinate direction along said surface; a second plurality of spaced electrical conductors associated with a second coordinate direction along said surface, said second coordinate direction being substantially perpendicular to said first coordinate direction; a flux source capable of inducing current pulses in those electrical conductors to which the flux source is inductively coupled; a propagation element for propagating non-electrical signals, which propagation element has a first portion inductively coupled to said first plurality of conductors and a second portion inductively coupled to said second plurality of conductors; and signal detection means associated with said propagation element for detecting non-electrical signals induced in said propagation element by current pulses in said first and second pluralities of conductors.

* * * * *